Dec. 9, 1969  L. B. HEESEN ET AL  3,482,986
PREPARING COMPOSITE FORAGE IN PELLET FORM
Filed Oct. 26, 1966
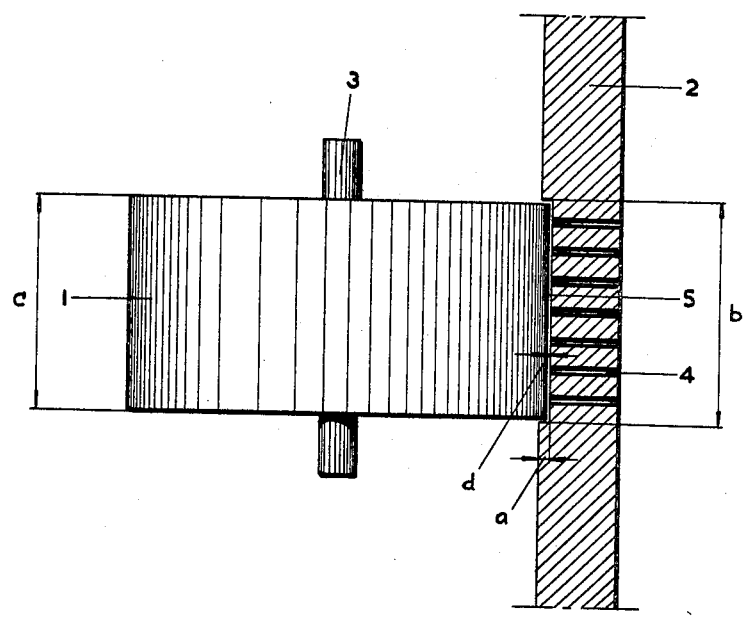
LEONARDUS B. HEESON,
THEODORUS J. HEESON,
LEONARDUS B HEESON, Jr.
INVENTORS
BY
ATTORNEY

# United States Patent Office 3,482,986
Patented Dec. 9, 1969

3,482,986
PREPARING COMPOSITE FORAGE IN PELLET FORM
Leonardus Bernardinus Heesen, Theodorus Jacobus, Heesen, and Leonardus Bernardinus Heesen, Jr., Boxtel, Netherlands, assignors to Machinefabriek Heesen N.V., Boxtel, Netherlands, a corporation of the Netherlands
Filed Oct. 26, 1966, Ser. No. 589,599
Claims priority, application Great Britain, Nov. 2, 1965, 46,294/65
Int. Cl. A23j 1/14
U.S. Cl. 99—2                                         5 Claims

ABSTRACT OF THE DISCLOSURE

A process for producing grains in pellet form by crushing the grains between crushing rolls to powder the starch portions while the cellulosic parts are reduced to broken but unpowdered cutile form and thereafter pelletizing.

BACKGROUND OF THE INVENTION

Field of the invention

The invention relates to a method for preparing composite forage in pellet form, in which at least grains are present as components. Composite forage consists of a great number of products, such as waste products of the foodstuff industry, the flour industry (brans, cake and scales) the edible oil industry (scrap) and the sugar industry (pulp and molasses), while further products such as fish-meal and animal-meal and the like are added. The forage consists, however, for the greater part of grains such as the forage cereals maize, oats, barley, rye and wheat, while further also minerals and vitamine preparations are added and sometimes antibiotics and fats.

Description of the prior art

Formerly only composite forage in meal form has been used. Such forage is still used, but more and more the farmers wish to receive the forage in pellet form. Forage in pellets has many advantages, which are known and not important here.

It is understandable that these pellets were prepared from forage in meal form, as this kind of forage was available. Forage in meal-form must have a very homogeneous structure in order to avoid separation of the mixture during transport and in order to cause the animals eating without the possibility of choosing certain ingredients. In order to obtain this homogeneous structure many mixing treatments are necessary. For instance the dry products are mixed first, then the mixture is ground. In an additional mixer the products which have already a powdery form as well as the minerals and the vitamines are added. After this the molasses is added. For this again a special device is necessary. The same is the case for supplying fluid fats. From the mixture obtained pellets are made in a pellet mill, after which the pellets are separated from the remaining powder.

All these treatments are necessary for obtaining a homogeneous meal product, which treatments are very expensive, as for instance much power is used for grinding. The required power for grinding is very different for the different components. For instance for grains, grinding the starch parts is very easy but the outer walls of the cells consisting of cellulose require much power for grinding, so that the grinding, for which hammer mills are used normally, requires a high power.

SUMMARY OF THE INVENTION

Applicant has found that a homogenous meal product is unnecessary and even unfavourable for preparing pellets. For meal forage a fine grinding is necessary to avoid separation.

The invention aims to obtain a method with which the components are reduced in size in a selective way, thus not all parts of each component are reduced till the same size.

BRIEF DESCRIPTION OF THE DRAWING

In the accompanying drawing, the single figure is a diagrammatic elevation, partly in section, of an improved pellet mill constituting an apparatus part of the invention.

DESCRIPTION OF THE PREFERRED EMBODIMENTS

The invention is characterized in that the grains, if desired premixed with other pulverous or liquous components, are reduced in size in such extent that the starch parts of the grains are as fine as possible, while the cellulosic parts of the grain are only broken into pieces.

If the very tough parts of the components, such as the walls of the grains are reduced hardly, but the soft parts such as the flour parts of the grains are reduced very extensive, there will be saved much power with respect to the usual method. Moreover, it is much easier to make pellets from selectively reduced components. Fine grinding of for instance the walls of cellulose is very unfavourable for making pellets, as applicant found that these walls, which form the roughage, have a favourable effect on making pellets if the total surface of these walls is kept as small as possible, while the digestable parts, thus the inner parts of the grains are ground as fine as possible and the total surface is made as large as possible.

It appeared that the cattle prefer the pellets made according to the invention over the pellets made from mealfood. Moreover, the food is used more economically.

The invention wishes to make use of the different toughness of the parts. For that purpose the products, such as grains, premixed or not, are supplied to a roll system, which rolls crush the products to a thin film. In order to avoid the presence of too big parts the products may be supplied first to a set of breaking or cutting rolls, so that a certain maximum size of e.g. the grains is obtained. At the same time one can use small crush rolls as a result of this breaking and cutting.

At crushing of for instance grains the soft kernel is pulverized completely, while the walls are torn in pieces and appear as cuticles in the crushed product. These cuticles of a thready structure have a weaving effect at making pellets.

After this the product is mixed again. If necessary already powdery components and liquids are added. Then the product is supplied to the pellet mill, the grinding effect of which is also substantial a crushing effect.

If pellets are made from meal the working of the pellet mill does not contribute to grinding but according to the invention the pellet mill operates moreover as a second crushing mill.

If pellets are made from meal the distance between the roll(s) and the die of the pellet mill must be as small as possible vide for instance the British patent specification 974,045. Otherwise the meal escapes.

According to the invention this distance may be much larger at least 0.016″, as the grip of the roll on the product is much greater. If such a greater distance between the roll(s) and the surface of the die is used one can make a recessed path in the die, so that each roll moves in a channel. In this way escape during pelleting is avoided. One can use one or more extrusion rolls.

The improvement of the known pellet mill, vide e.g. the British patent specification 974,045, is shown in the attached diagrammatical drawing. The extrusion roll 1 moves along the inner surface of a cylindrical die plate 2, whereby the roll 1 rotates about its axis 3. The die plate 2 is as usual provided with extrusion holes 4. In the action zone of the roll 1, the die plate 2 is provided with a recessed channel 5 forming a runway for the roll 1, extending partly into this channel 5. The depth $a$ of the channel 5 is for instance 0.16" and the width $b$ is for instance 0.16" greater than the width $c$ of the roll 1 so that the cleanrance on both sides of the roll 1 is 0.08". In practice the width $c$ is e.g. 3". The distance $d$ between the outer surface of the roll 1 and the bottom of the channel 5 is at least 0.016" as mentioned before.

With this type of pellet mill the grains are crushed subsequent to the crushing in the main crushing mill.

Although a crushing operation is mentioned for obtaining a selective reduction, this reduction may be obtained also in other ways. The main crushing operation itself need not to be obtained with rolls as mentioned.

What we claim is:

1. Process for forming composite forage in pellet form, said composite forage comprising cereal grains, said process being characterized in that (a) the cereal grains are prepared by crushing them between crushing rolls, whereby the starch portions thereof are powdered and the cellulosic parts are reduced to broken but unpowdered cuticle form, and (b) the composite forage comprising the so prepared cereal component is thereafter pelletized.

2. Process as claimed in claim 1, wherein before being subjected to step (a) the said cereal components are broken into particles of a predetermined maximum particle size with the aid of breaking or cutting rolls.

3. Process as claimed in claim 1, wherein in step (b) the forage is fed to and further crushed in a roller type pellet mill.

4. Process as claimed in claim 1, wherein in step (b) the forage is fed to and further crushed in a roller type pellet mill having one or more extrusion rolls moving along a surface of a perforated die and in which each said extrusion roll has its outer surface spaced from the surface of the die by a minimum distance of at least 0.016".

5. Process as claimed in claim 1, wherein in step (b) the forage is fed to and further crushed in a roller type pellet mill having one or more extrusion rolls moving along a surface of a perforated die and in which said die is provided with a recessed runway into which each said extrusion roll extends, and in that the surface of each said extrusion roller is spaced at least 0.016" from the bottom of the recessed runway.

References Cited

Stroup: Pelleting, Proceeding of the 1959 Feed Production School, Feed Production School, Inc. pp. 18–23, September 1959.

A. LOUIS MONACELL, Primary Examiner

NORMAN ROSKIN, Assistant Examiner

U.S. Cl. X.R.

99—80